United States Patent [19]
Pardini et al.

[11] Patent Number: 5,906,660
[45] Date of Patent: *May 25, 1999

[54] PROCESS FOR THE MANUFACTURE OF PERSALT PARTICLES

[75] Inventors: Romano Pardini, I-Rosignano-Solvay; Soraya Parvaneh, I-Livorno; Corrado Baccani, Milan, all of Italy

[73] Assignee: Solvay Interox (Société Anonyme), Brussels, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 08/856,820

[22] Filed: May 15, 1997

Related U.S. Application Data

[63] Continuation of application No. 08/531,949, Sep. 21, 1995, abandoned.

[30] Foreign Application Priority Data

Sep. 22, 1994 [IT] Italy .................................. MI94A1928

[51] Int. Cl.⁶ .............................. C01D 1/30; C01B 31/24
[52] U.S. Cl. .......................... 23/295 R; 23/302; 422/252; 423/415.2
[58] Field of Search ......................... 423/415.2; 422/252; 23/295 R, 302

[56] References Cited

U.S. PATENT DOCUMENTS

| | | | |
|---|---|---|---|
| 2,986,448 | 5/1961 | Gates et al. | 423/415.2 |
| 3,883,311 | 5/1975 | Kanal et al. | 422/252 |
| 4,113,552 | 9/1978 | Bella, Jr. et al. | 422/252 |
| 4,174,382 | 11/1979 | Menche | 422/252 |
| 4,830,836 | 5/1989 | Uchino et al. | 423/415.2 |

FOREIGN PATENT DOCUMENTS 1070084  1/1980  Canada .

OTHER PUBLICATIONS

R.H. Perry: "Perry's Chemical Engineer's Handbook". Sixth Edition, 1985, McGraw–Hill, New York, pp. 19–24 to 19–40.

*Primary Examiner*—Gary P. Straub
*Attorney, Agent, or Firm*—Venable; John W. Schneller

[57] ABSTRACT

Continuous process for the manufacture of solid particles of alkali metal persalts by reaction of an aqueous hydrogen peroxide solution with an aqueous solution of an alkali metal salt and crystallization of the persalt formed in a crystallizer-classifier comprising a stirred formation and growth region for the persalt crystals, a nonstirred clarifying region for the solution and a classification region for the particles obtained by elutriation in a liquid stream withdrawn in the clarifying region.

Plant for manufacturing the said particles.

12 Claims, 2 Drawing Sheets

PROCESS FOR THE MANUFACTURE OF PERSALT PARTICLES

This application is a continuation of application Ser. No. 08/531,949, filed Sep. 21, 1995 now abandoned.

FIELD OF THE INVENTION

The invention relates to a process for the manufacture of solid persalt particles.

The solid persalt particles obtained by the process are used in various types of industry as an active oxygen vehicle in the solid state and, in particular, in the detergents industry.

TECHNOLOGY REVIEW

Processes for the manufacture of persalts by crystallization from a supersaturated aqueous solution obtained by mixing concentrated solutions of hydrogen peroxide and of a water-soluble salt in a crystallizer have been known for a long time (U.S. Pat. No. 2,986,448). In this patent, it is also taught, as a variant, that it is possible to use another type of crystallizer, in which a supersaturated solution flows in a rising movement through a bed of crystals which are being formed and are growing, which makes it possible to carry out a certain classification of the particles (Oslo-type crystallizer, column 3, lines 9 to 12).

These known processes, however, have the disadvantage of providing persalts whose particle size distribution is still relatively broad and whose stability is not very high. Their operation under continuous conditions is, moreover, often made difficult by the deposition of crystals which become firmly attached to the walls of the equipment and come to form crusts which it is necessary to remove periodically.

The invention overcomes the disadvantages of the known processes by providing a process which makes it possible to obtain, under economic conditions, stable SPC with a narrow particle size distribution by means of a continuous process.

SUMMARY OF THE INVENTION

To this end, the invention relates to a continuous process for the manufacture of solid particles of at least one persalt of at least one alkali metal by reaction of a concentrated aqueous hydrogen peroxide solution with a concentrated aqueous solution of at least one salt of at least one alkali metal and crystallization of the persalt formed in a crystallizer-classifier, according to which the crystallizer contains a clarifying region surmounting a stirred region through which passes a rising stream of a supersaturated solution of persalt in which persalt particles move in the contrary direction to that of the solution, the crystallizer being arranged above a classifier in which the solid persalt particles are subjected to elutriation and gather in the lower part of the classifier, where they are drawn off.

DETAILED DESCRIPTION OF THE INVENTION

Figure 1:
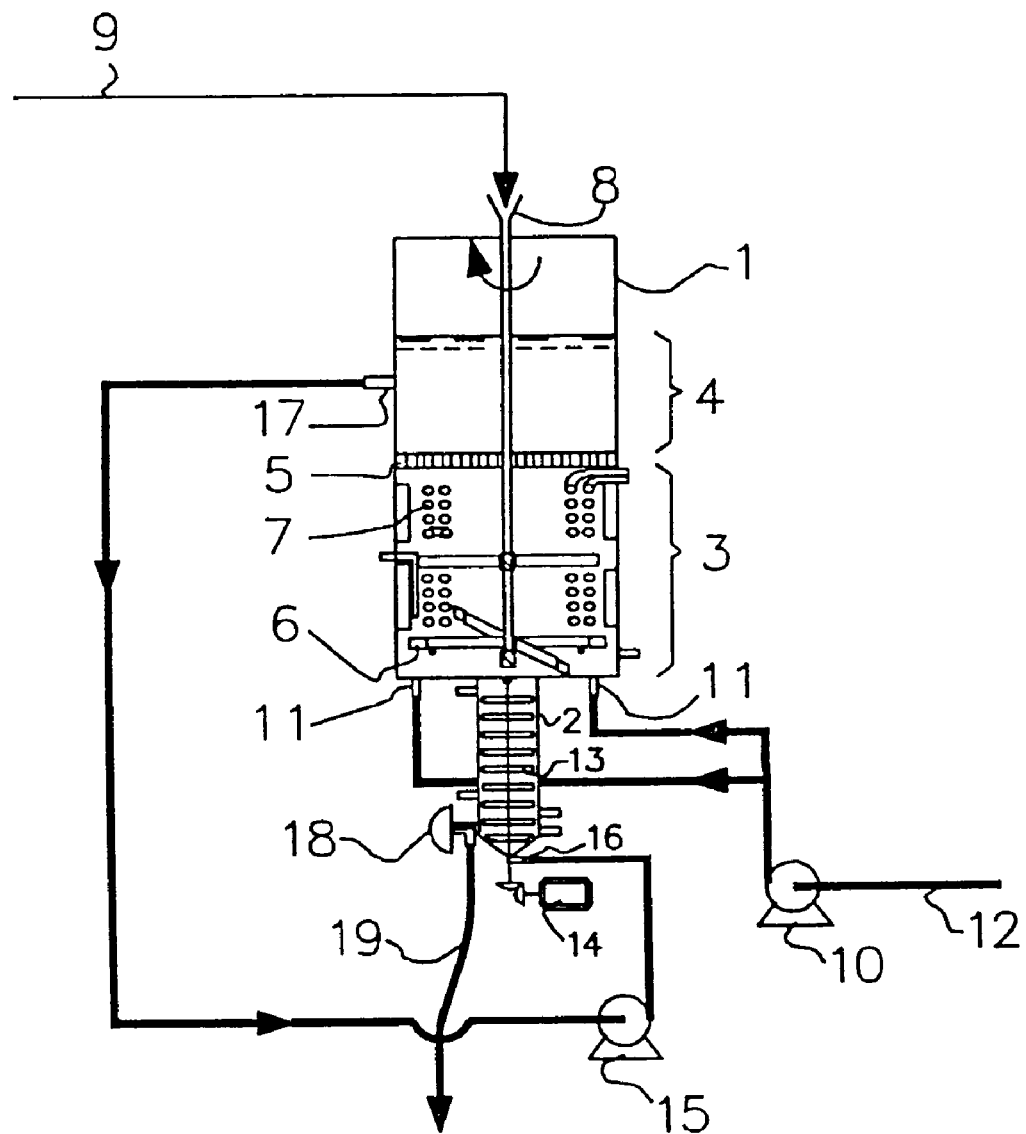
FIG. 1 illustrates a plant essentially composed of a cylindrical vessel (1) which acts as a crystallizer and a cylinder (2) which acts as a classifier.

Persalt is understood to denote any inorganic compound which is solid under normal temperature and pressure conditions and which releases, when dissolved in water, hydrogen peroxide and a salt of an inorganic acid. Examples of persalt in accordance with the process according to the invention are perborates, phosphate peroxohydrates and carbonate peroxohydrates.

The process in accordance with the invention applies in particular to the manufacture of solid particles of alkali metal perborates or carbonate peroxohydrates. It has given excellent results in the manufacture of alkali metal carbonate peroxohydrates.

The process can be applied for the manufacture of persalts of any alkali metal. It is highly suitable for the manufacture of sodium or potassium persalts. It has given excellent results in the manufacture of sodium persalts.

The process according to the invention is very especially suitable for the manufacture of the sodium carbonate peroxohydrate, of formula $2Na_2CO_3.3H_2O_2$, commonly known as sodium percarbonate.

The process can also be used for the manufacture of a mixture of a number of persalts, for example of a mixture of alkali metal perborate and of alkali metal carbonate peroxohydrate. It can also be used for the manufacture of a mixture of persalts of different alkali metals, such as, for example, of sodium and potassium persalts.

Alkali metal salt is understood to denote a water-soluble alkali metal salt of an inorganic acid capable of fixing hydrogen peroxide by formation of a compound which is solid under normal temperature and pressure conditions, also known as persalt as defined above. Examples of such salts are alkali metal borates, alkali metal phosphates and alkali metal carbonates. Sodium or potassium metaborate and sodium or potassium carbonate are preferred. Sodium carbonate has given excellent results.

According to the invention, the operation is carried out in a crystallizer/classifier, that is to say in an apparatus which makes it possible to generate solid crystals and to control their growth, for the purpose of obtaining particles with a narrow particle size distribution.

In the process in accordance with the invention, the persalt solution obtained by reaction of hydrogen peroxide with the alkali metal salt moves in the crystallizer-classifier as a stream which passes from the bottom upwards through a bed of persalt crystals which are being formed and are growing. This persalt solution is maintained in the crystallizer-classifier under concentration and temperature conditions which are adjusted to create a state of slight supersaturation.

The concentrated aqueous hydrogen peroxide solution used can contain variable amounts of $H_2O_2$ as a function of the type of persalt manufactured and of other working conditions. Use is advantageously made of aqueous solutions containing at least 15 weight %, and preferably at least 20 weight %, of hydrogen peroxide. It is advantageous, in order to keep the process safe, to use aqueous hydrogen peroxide solutions containing not more than 80 weight %, and preferably not more than 70 weight %, of hydrogen peroxide. 35 to 45 weight % hydrogen peroxide solutions have given excellent results.

The concentration of the aqueous alkali metal salt solution to be used depends on the solubility in water and, consequently, on the nature of the salt employed, on the nature and on the amount of salting-out agent used and on the temperature and pressure conditions prevailing in the crystallizer. This concentration is usually adjusted in order to obtain, after reaction with the concentrated hydrogen peroxide solution, an aqueous solution which is supersaturated in the persalt to be crystallized.

According to the invention, the persalt solution can contain at least one salting-out agent and at least one stabilizer. Salting-out agent is understood to denote an agent which decreases the solubility of the persalt in aqueous solution and whose presence facilitates crystallization of this persalt. Among the various possible salting-out agents, it is preferable to use an inorganic strong acid salt of an alkali metal identical to the alkali metal of the persalt. In the case of the manufacture of sodium percarbonate, the salts NaCl and $Na_2SO_4$, which have, in aqueous solution, the common cation $Na^+$ with the sodium percarbonate, are highly suitable. The concentration of the salting-out agent in the hydrogen peroxide solution is usually chosen from at least 4 g/100 g of solution and preferably from at least 9 g/100 g of solution. It does not generally exceed 25 g/100 g of solution and preferably does not exceed 19 g/100 g of solution. Salting-out agent concentrations of 16.5 g/100 g of solution in the case of the use of NaCl and of 9 g/100 g of solution in the case of the use of $Na_2SO_4$ have given excellent results.

Stabilizer is also understood to denote any compound capable of protecting hydrogen peroxide against decomposition and, consequently, the loss of its active oxygen. The usual stabilizers of aqueous alkaline hydrogen peroxide solutions are generally highly suitable, in particular sodium and potassium silicates, soluble magnesium salts, and inorganic or organic sequestering agents. Among the latter, organic phosphonates have given good results, in particular the sodium salt of 1-hydroxyethane-1,1-diphosphonic acid.

The concentrations of stabilizers used vary according to the effectiveness of these compounds in stabilizing hydrogen peroxide. In the case of sodium or potassium silicates, the concentration will not generally fall below 10 g of silicate/kg of $Na_2CO_3$ used. However, the concentration will most often not exceed 80 g of silicate/kg of $Na_2CO_3$. In the case of the sequestrants, which are more effective products, the concentration will not fall below 1 g of sequestrant/kg of $Na_2CO_3$. For sequestrants, amounts of 20 g/kg of $Na_2CO_3$ constitute an upper limit which is not generally exceeded. It is also advantageous to use a number of stabilizers in combination. A combination of 40 g of sodium silicate/kg of $Na_2CO_3$ and of 2.4 g of sodium salt of 1-hydroxyethane-1,1-diphosphonic acid/kg of $Na_2CO_3$ has given excellent results.

The salting-out agent and stabilizer can be incorporated at various points in the process. These products can be incorporated without distinction, separately or as a mixture, in the solid form or in the form of an aqueous solution. The injection of the salting-out agent into the alkali metal salt solution and of the stabilizer into the hydrogen peroxide solution has given excellent results.

According to an advantageous variant of the process in accordance with the invention, a crystallization adjuvant is incorporated in the alkali metal salt solution. This term is understood to denote a compound or a composition which modifies the shape of the crystals obtained by converting the acicular crystals into less angular and less fragile shapes. Examples of such adjuvants are condensed phosphates, such as ammonium or sodium hexametaphosphate and pyrophosphate, and water-soluble homo- or copolymers of acrylic acid.

The amount of crystallization adjuvants which are used in the process according to the invention depends, to a large extent, on various parameters such as, for example, the nature of the adjuvant, the temperature and stirring conditions which prevail in the crystallizer and the residence time of the solutions in the crystallizer. Generally, this amount will not be less than 2 g/kg of $Na_2CO_3$ used and preferably not less than 5 g/kg of $Na_2CO_3$. Most often, the amount of adjuvant will not exceed 50 g/kg of $Na_2CO_3$ and, preferably, will not exceed 30 g/kg of $Na_2CO_3$. It is sometimes advantageous to combine the effect of a number of different adjuvants.

According to the invention, the hydrogen peroxide and alkali metal salt solutions are injected into a formation and growth region situated in the lower part of a continuous crystallizer which functions both as reactor for generating the supersaturated persalt solution and as crystallizer for separating the particles of this same persalt from the remainder of the solution. The formation and growth region of the crystallizer is continuously stirred and a rising stream of liquid, in which the crystals forming the persalt particles are born and grow, passes through this region.

An advantageous variant of the process according to the invention consists in adjusting the density of the suspension of particles growing in the formation and growing region so that it is never less than 25 weight % of solids and, preferably, not less than 30 weight % of solids.

Moreover, it is not generally advantageous to exceed a suspension density of 60 weight % of solids in the formation and growth region and preferably not advantageous to exceed a density of 50 weight % of solids.

The temperature prevailing in the crystallizer is adjusted so that conditions of slight supersaturation of the persalt solution are maintained therein, taking into account the nature and the amount of the various additives and, in particular, of the salting-out agent. Generally, it will be at least equal to 5° C. and, preferably, at least equal to 80° C. Most often, this temperature will not exceed 40° C. and, preferably, will not exceed 35° C. Temperatures of 10 to 30° C. have given excellent results.

According to the invention, the formation and growth region is a stirred region. This stirring can be carried out by a known device, provided that the stirring is vigorous and restricted to the formation and growth region. Among the various industrial stirrers possible, rotary stirrers are highly suitable. It was observed that, for a reduced-scale pilot plant (50 l crystallizer), rotational speeds of at least 40 revolutions/min and, preferably, of at least 50 revolutions/min are generally appropriate. Most often, in such a pilot plant, a rotational speed of the stirrer of 120 revolutions/min and, preferably, of 100 revolutions/min will not be exceeded. Rotational speeds of 60 to 90 revolutions/min have given good results in the pilot plant.

According to the process in accordance with the invention, the rising stream of liquid subsequently enters the non-stirred region in the upper part of the crystallizer, where it is clarified in a calm region known as the clarifying region.

When the persalt crystals grow in the formation and growth region, there comes a certain point when they form particles whose size becomes sufficient for them no longer to be carried by the rising stream nor by the liquid movements caused by the stirring. These particles then start to migrate in the opposite direction to the general rising movement of the liquid which passes through the formation and growth region and settle out towards the base of the crystallizer.

In accordance with the process according to the invention, these particles leave the crystallizer via the base of the formation and growth region where they are subsequently directed towards a classifier arranged below the crystallizer (classification region). The persalt particles are subsequently subjected therein to elutriation in a rising liquid stream.

According to the invention, the elutriation liquid injected at the base of the classification region arises from a withdrawal of the part of the liquid which flows in the upper part of the clarifying region of the crystallizer. This liquid is injected under pressure at the base of the classifier.

The flow rate of the liquid withdrawn in the clarifying region and reinjected under pressure at the base of the classifier must be adjusted according to the mean size of the persalt particles which it is desired to produce. For a classifier of fixed diameter, it is directly proportional to the upward velocity of this liquid in the classifier. It is generally arranged for the upward velocity of the liquid in the classifier to be at least 5 m/h and, preferably, at least 10 m/h. Likewise, an upward velocity of the liquid will most often be chosen which does not exceed 100 m/h and, preferably, does not exceed 80 m/h. Upward velocities of 20 to 50 m/h have given good results.

The overflow of liquid spilling over from the upper part of the classifier is reinjected into the circuit for dissolution of the alkali metal salt.

The persalt particles which have accumulated at the base of the classifier are withdrawn by means of a withdrawal device situated at the foot of the classification region.

According to an advantageous variant of the process in accordance with the invention, the particles which pass through the classification region are subjected to stirring carried out within the rising liquid of the classifier. Preferably, this stirring uses, however, less energy than that which is expended in the stirring carried out in the formation and growth region of the crystallizer. Generally, the energy will not exceed 70% of the stirring energy of the formation and growth region and, preferably, will not exceed 50% of the latter.

The invention also relates to the use of the process for manufacturing an alkali metal carbonate peroxohydrate and, in particular, a sodium carbonate peroxohydrate.

The invention further relates to an industrial plant for persalt manufacture by crystallization-classification comprising a crystallization vessel of cylindrical shape equipped with a rotary stirrer and with a cooling system, according to which the vessel contains a device for separation between a lower stirred region, in which the stirrer is arranged, and an upper region, which does not have a stirrer, intended for clarifying the liquid comprising crystallization mother liquors, the stirred region is equipped at its base with systems for admission of the reactants comprising the starting materials for the manufacture of the persalt, a cylinder with a diameter less than that of the vessel is arranged below the latter, is in communication with it and is equipped at its base with a system for injection of the solution arising, via a recirculating pump, from a withdrawal pipe whose source is situated at the upper part of the non-stirred region of the vessel, this cylinder comprising a region for classification by elutriation of the particles originating from the stirred region of the vessel, and a device for drawing off the classified particles is connected to the base of the said cylinder.

Preferably, the classification cylinder is arranged so that its axis is the same as that of the crystallization vessel.

It is, moreover, particularly advantageous to make the classification cylinder integral with the bottom of the crystallization vessel.

An advantageous variant of the industrial plant according to the invention comprises the use of a stirrer which, in addition to its function of homogenizing the formation and growth region, carries out the injection and the distribution of one of the two concentrated aqueous solutions, namely the hydrogen peroxide solution or the alkali metal salt solution.

To this end, use is made of a paddle stirrer provided with a hollow shaft which comprises a pipe, the lower part of which is in communication with pipes hollowed out over the entire length of the lower paddles of the stirrer and which end at the tips of the paddles.

Another advantageous variant of the industrial plant according to the invention comprises equipping the classification region with a stirrer. Various types of stirrers can be used.

The plant is, moreover, explained with more details in the description which follows and which refers to the drawings of the appended figures giving a schematic representation of a preferred embodiment of the plant according to the invention.

As shown in FIG. 1, the plant is essentially composed of a cylindrical vessel 1 which acts as crystallizer and of a cylinder 2 which acts as classifier, with a diameter less than that of the vessel 1 and integral with the bottom wall of the latter. The cylinder 2 is in communication with the bottom of the vessel 1 and is arranged in the same axis as the latter.

The vessel 1 is separated into two regions 3 and 4, formation and growth region and clarifying region respectively, separated by the grid 5. The crystallization vessel may be of cylindrical shape equipped with a rotary stirrer. The vessel contains a grid between a lower stirred region, in which the rotary stirrer is arranged, and an upper region, which does not have a stirrer, intended for clarifying the crystallization mother liquors. The stirred region is equipped at its base with systems for the admission of the starting materials for the manufacture of the persalt. A cylinder with a diameter less than that of the cylindrical vessel is arranged below the cylindrical vessel, in communication with it and is equipped at its base with a system for the injection of the solution arising, from a recirculation pump, from a withdrawal pipe whose source is situated at the upper part of the non-stirred region of the vessel. This cylinder with a diameter less than that of the crystallization vessel includes a region for classification by elutriation of the particles originating from the stirred region of the crystallization vessel. The region 3 contains a paddle stirrer 6 and a metal double coil 7 in which a cooling fluid circulates. The shaft of the stirrer 8 is hollow, as are the paddles 6, and are in communication with the delivery stream 9 of the concentrated aqueous hydrogen peroxide solution. A pump 10 makes it possible to inject under pressure, at the base 11 of the vessel, the concentrated aqueous solution of the alkali metal salt conveyed by the pipe 12.

The classification cylinder 2 is equipped with a paddle stirrer 13 driven by a motor 14. A recirculating pump 15 makes it possible to inject under pressure, at the base 16 of an inverted cone situated under the cylinder 2, a solution withdrawn in the upper part 17 situated in the calm clarifying region. A withdrawal device 18 for the classified particles is connected to the base of the classification cylinder 2. It makes it possible to draw off the classified particles from the plant via the pipe 19.

Figure 2:
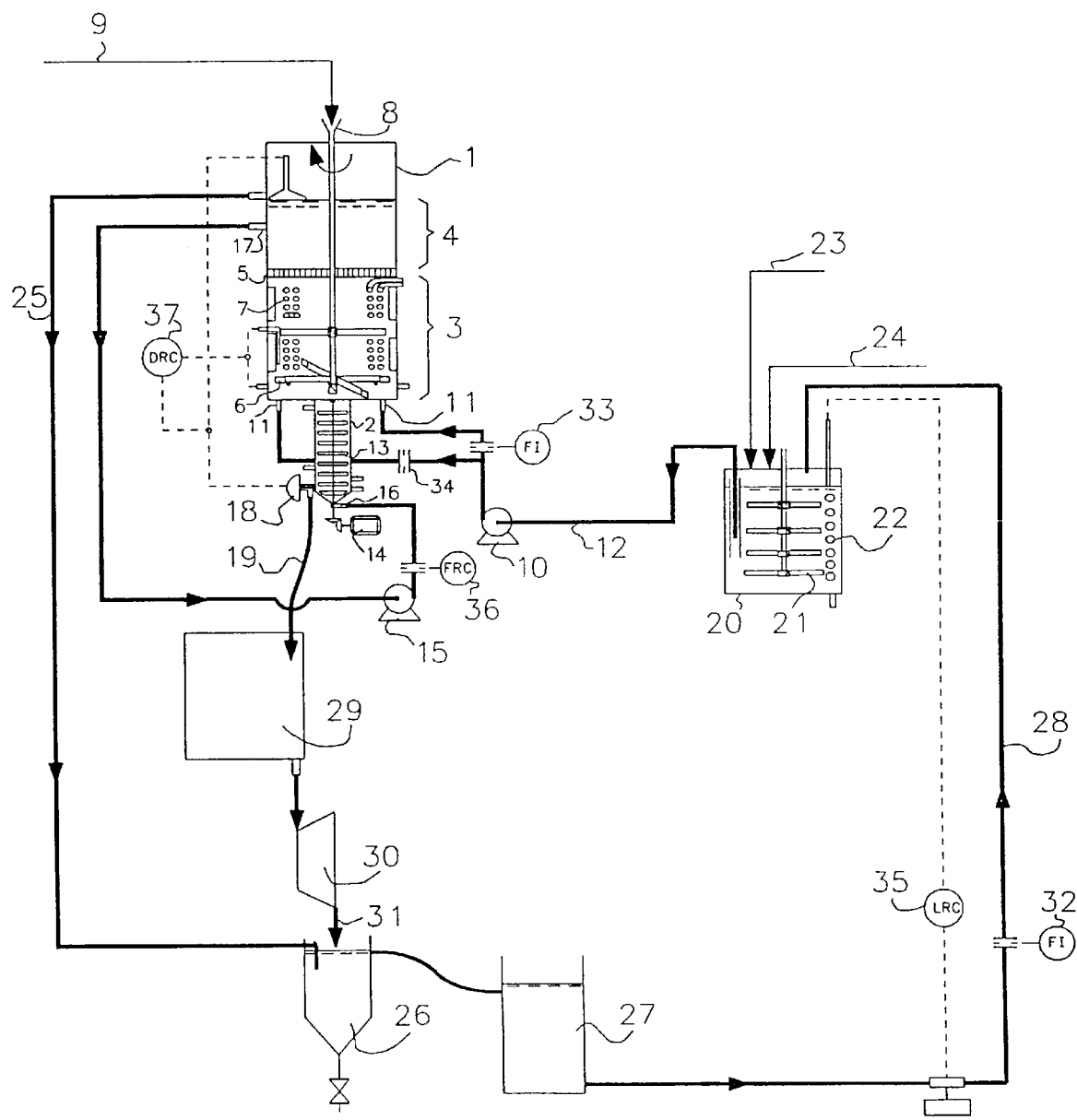
FIG. 2 illustrates the connection of the crystallizer-classifier with another device involved in the production of persalt particles.

FIG. 2 illustrates the connection of the crystallizer-classifier with other devices which are involved in the production of the persalt particles.

The pipe 12 for conveying the alkali metal salt solution originates from a vessel for dissolution of the reactants 20 equipped with a stirrer 21 and with a heating coil 22. This vessel is supplied with a mixture of $Na_2CO_3$ containing the stabilizer and the optional crystallization adjuvant via the inlet 23. The pipe 24 makes it possible to adjust the pH of the solution by means of a 2N NaOH solution so as to maintain a pH of approximately 10 to 10.5 in the crystallizer. The overflow from the crystallizer 1 is recycled via the pipe 25, the buffer tanks 26 and 27 and the pipe 28 into the dissolution vessel.

The solid persalt particles drawn off from the classification region 2 via the pipe 19 are stored temporarily in the buffer tank 29 before being centrifuged and washed in the centrifuge 30. The mother liquors and the aqueous wash liquors arising from the centrifuge 30 are directed via the pipe 31 towards the buffer tank 26, where they are recovered.

The plant is further equipped with flow indicators 32, 33 and 34, marked FI ("Flow Indicator"), and with devices for recording and controlling level 35, marked LRC ("Level Recorder Controller"), flow rate 36, marked FRC ("Flow Recorder Controller") and density of the suspension 37, marked DRC ("Density Recorder Controller").

EXAMPLES

The examples which follow are given with the aim of illustrating the invention, without limiting the scope thereof in any way.

Example 1R (not in accordance with the invention)

An amount of $Na_2CO_3$ adjusted in order to obtain a solution containing 120 g $Na_2CO_3$/kg of solution was dissolved continuously and with stirring at 110 revolutions/minute and at a temperature of 42° C. in a 25 l dissolution vessel. Two stabilizers were added thereto in the form of sodium silicate, of 40° Bé grade (molar ratio $SiO_2/Na_2O$= 3.4), in the proportion of 20 g/kg $Na_2CO_3$ present in the solution and of sodium hexametaphosphate in the proportion of 6 g/kg of $Na_2CO_3$. Ammonium polyacrylate of trademark Pigmentverteiler® A, marketed by BASF, was then introduced therein in the proportion of 10 g/kg of $Na_2CO_3$. The flow rate of the $Na_2CO_3$ solution containing the stabilizers was kept constant at 5 kg $Na_2CO_3$/h.

A crystallizer of cylindrical shape (volume 50 l) and equipped with a stirrer was used. The stirrer of the crystallizer was a paddle stirrer of Ekato® MIG type. The crystallizer was supplied continuously via the rotational shaft of the stirrer with a 40% $H_2O_2$ solution containing 22 g NaCl/100 g of solution as salting-out agent and with the flow rate of 5 kg $Na_2CO_3$/h of the $Na_2CO_3$ solution containing the stabilizers and salting-out agents originating from the dissolution vessel. The flow rate of the $H_2O_2$ solution introduced was kept constant at 5 l/h.

A density of 20% of solids was maintained in the crystallizer throughout the test.

The rotational speed of the stirrer of the crystallizer was from 70 to 75 revolutions/min.

As soon as the plant was put into operation, a residual $H_2O_2$ content of 1.0 g $H_2O_2$ /100 g of solution and an NaCl content of 20 g NaCl/100 g of solution were established in the $Na_2CO_3$ solution leaving the dissolution vessel.

A suspension of sodium percarbonate particles with a density of approximately 20 weight % of solids was continuously withdrawn at the base of the crystallizer.

The sodium percarbonate particles obtained had the following characteristics:

| Characteristics of the percarbonate obtained | Example 1R |
|---|---|
| Mean diameter, μm | 780 |
| Span | 1.2 |
| Apparent density, kg/l | 0.82 |
| Active oxygen content, % | 14.1 |
| NaCl content, % | 5.5 |
| $SiO_2$ content, % | 0.3 |
| $PO_4$ content, % | 0.16 |

The particle size characteristics, namely the mean diameter and the span, were determined by means of a laser particle sizer. The mean diameter is the 50% mean diameter ($D_{50}$) read on the cumulative particle size curve which corresponds to 50% of the weight of the particles. The span is the measurement of the spread of the particle size distribution of the particles. It is calculated from the mean diameters $D_{90}$, $D_{10}$ and $D_{50}$ that is to say the mean diameters read on the cumulative particle size curve such that, respectively, 90 weight %, 10 weight % and 50 weight % of the particles have a smaller diameter. The analytical expression of the span is the following:

$$\text{span} = \frac{D_{90} - D_{10}}{D_{50}}$$

Example 2

(in accordance with the invention)

An amount of $Na_2CO_3$ adjusted in order to obtain a solution containing 120 g $Na_2CO_3$/kg of solution was dissolved continuously and with stirring at 110 revolutions/minute and at a temperature of 42° C. in the 25 l dissolution vessel of a plant similar to that described in FIGS. 1 and 2. Two stabilizers were added thereto in the form of sodium silicate, of 40° Bé grade (molar ratio $SiO_2/Na_2O$=3.4), in the proportion of 20 g/kg $Na_2CO_3$ present in the solution and of sodium hexametaphosphate in the proportion of 6 g/kg of $Na_2CO_3$. Ammonium polyacrylate of trademark Pigmentverteiler® A, marketed by BASF, was then introduced therein in the proportion of 10 g/kg of $Na_2CO_3$. The flow rate of the $Na_2CO_3$ solution containing the stabilizers was kept constant at 4.2 kg $Na_2CO_3$/h.

A crystallizer of cylindrical shape (volume 50 l), equipped in its lower part with a nonstirred classification leg also of cylindrical shape (diameter 9 cm, height 46 cm), was used. The stirrer of the crystallizer was a paddle stirrer of the Ekato® MIG type. The crystallizer was continuously supplied via the rotational shaft of the stirrer with a 40% $H_2O_2$ solution containing 16.5 g NaCl/100 g of solution as salting-out agent. The flow rate of the $H_2O_2$ solution introduced was kept constant at 5 l/h.

A flow rate of 300 l/h was continuously withdrawn from the clarifying region and was reinjected under pressure at the base of the classification region. The overflow from the crystallizer was recycled to the dissolution vessel. A density of 35% of solids was maintained in the reaction and growth region of the crystallizer throughout the test.

The rotational speed of the stirrer of the crystallizer was from 70 to 75 revolutions/min.

When the plant is put into operation, a residual $H_2O_2$ content of 0.5 g $H_2O_2$/100 g of solution and an NaCl content of 15 g NaCl/100 g of solution were established in the $Na_2CO_3$ solution leaving the dissolution vessel.

A suspension of sodium percarbonate particles with a density of approximately 40 weight % of solids was continuously withdrawn at the base of the classification leg.

After operating for 4 hours, encrustations developed in the crystallization leg in the vicinity of the withdrawal device for the particles. The test was interrupted after operating for 10 hours as a result of the encrusting of the classification leg.

The sodium percarbonate powders obtained had the following characteristics:

| Characteristics of the percarbonate obtained | Example 2 |
|---|---|
| Mean diameter, μm | 900 |
| Span | 1.1 |
| Apparent density, kg/l | 0.85 |
| Active oxygen content, % | 14.3 |
| NaCl content, % | 3 |
| SiO$_2$ content, % | 0.15 |
| PO$_4$ content, % | 0.45 |
| Stability on drying, active O loss, % | 12 |

The particle size characteristics were determined in the same way as in Example 1R.

The measurement of the stability on drying consists in determining the active oxygen loss of the percarbonate after storage for 2 hours in an oven at 105° C. The active oxygen assay was carried out by conventional iodometry in acid medium.

Examples 3 to 5

(in accordance with the invention)

Example 2 was repeated after having installed, in the classification leg, a stirrer with flat ribs perpendicular to the axis of rotation, which stirrer is rotated at a speed of 20 revolutions/min. The following operating conditions were modified with respect to Example 2:

| Operating conditions | Example 3 | Example 4 | Example 5 |
|---|---|---|---|
| Na$_2$CO$_3$ solution composition, g/100 g solution: | | | |
| Na$_2$CO$_3$ | 15.5 | 24.0 | 12.0 |
| H$_2$O$_2$ | 1.0 | 1.3 | 1.0 |
| Salting-out agent: | | | |
| NaCl | 16.5 | 0 | 17.0 |
| Na$_2$SO$_4$ | 0 | 9.0 | 0 |
| Na$_2$CO$_3$ solution composition, g/kg Na$_2$CO$_3$: | | | |
| Stabilizers: | | | |
| Silicate | 40 | 40 | 20 |
| Dequest ® 2010 | 2.4 | 2.4 | 0 |
| Crystall. adjuvants: | | | |
| (NaPO$_3$)$_6$ | 0 | 0 | 6 |
| Na$_4$P$_2$O$_7$ | 0 | 7.5 | 0 |
| NH$_4$ polyacrylate | 10.0 | 0 | 0 |
| Crystallization temperature, °C. | 15 | 27 | 15 |
| Suspension density in the reaction and growth region, % solids | 35 | 35 | 10 |
| Flow rate of the Na$_2$CO$_3$ solution, kg Na$_2$CO$_3$/h | 6.6 | 6.6 | 4.2 |
| Concentration of the H$_2$O$_2$ solution, g H$_2$O$_2$/l | 466 | 513 | 533 |
| Flow rate of the H$_2$O$_2$ solution, l/h | 7.5 | 10 | 4 |
| Rotational speed of the stirrer of the crystallizer, r/min | 70–75 | 70–75 | 50 |
| Recycling flow rate (overflow), l/h | 40–45 | 35–40 | 40 |
| Suspension density on drawing off, % solids | 45 | 45 | 20 |

The stabilizer Dequest® 2010 was the sodium salt of 1-hydroxyethane-1,1-diphosphonic acid.

The ammonium polyacrylate employed was the product of trademark Pigmentverteiler® A, marketed by BASF.

The sodium percarbonates obtained had the following characteristics:

| Characteristics of the percarbonate obtained | Example 3 | Example 4 | Example 5 |
|---|---|---|---|
| Mean diameter, μm | 560 | 700 | 770 |
| Span | 0.6 | 0.7 | 1.1 |
| Apparent density, kg/l | 0.91 | 0.89 | 0.75 |
| Active oxygen content, % | 14.5 | 14.8 | 13.3 |
| NaCl content, % | 2.7 | 0 | 5 |
| Na$_2$SO$_4$ content, % | 0 | <0.5 | 0 |
| SiO$_2$ content, % | 0.35 | 0.35 | 0.2 |
| PO$_4$ content, % | 0.09 | 0.6 | 0.3 |
| Stability on drying, active O loss, % | 6.1 | 2.5 | 5.1 |

The measurements of the particle size characteristics and of the stability on drying were carried out according to the same methods as in the preceding examples.

What is claimed is:

1. A continuous process for the manufacture of solid particles of at least one persalt of at least one alkali metal by reacting an aqueous hydrogen peroxide solution with an aqueous solution of at least one salt of at least one alkali metal to form an alkali metal persalt, and crystallizing the alkali metal persalt formed in a crystallizer-classifier wherein the crystallizer contains a non-stirred clarifying region surmounting a region stirred by a rotary stirrer through which passes a rising stream of a supersaturated solution of persalt in which persalt particles move in the contrary direction to that of the solution said stirred region being identified as a formation and growth region, the crystallizer being arranged above a classifier in which the solid persalt particles are subjected to elutriation and gather in the lower part of the classifier, where they are drawn off, the non-stirred clarifying region and the stirred formation and growth region being separated by a grid, which restricts said stirring to said formation and growth region.

2. The process according to claim 1, comprising the rising movement of a solution of the persalt containing at least one salting-out agent and at least one stabilizer, the solution being maintained under supersaturation conditions and the movement being made through a bed of crystals of the persalt which are being formed and are growing, wherein the hydrogen peroxide and alkali metal salt solutions are injected into a lower part of a crystallizer, in a region subjected to rotary stirring, said formation and growth region, where they react to form a supersaturated solution of the persalt, the bed of crystals occupies the formation and growth region through which the rising stream of solution passes, so that, on departure from the formation and growth region, the solution passes through a grid, which restricts said stirring to said formation and growth region, and enters a nonstirred region where it continues its rising movement and is clarified within said clarifying region, the crystals growing in the formation and growth region form particles which, begin to move in the opposite direction to that of the solution and leave the formation and growth region via the lower part of the crystallizer in order to enter a classification region, situated in a classifier external to the crystallizer, under the formation and growth region of the latter, in which they are subjected to elutriation in a rising stream of a solution originating from a withdrawal of a part of the liquid from the upper part of the clarifying region of the crystallizer, the said withdrawn liquid being reinjected under pressure at the base of the classification region; and the particles produced are collected by being drawn off at the base of the classification region.

3. The process according to claim 2, wherein the particles which pass through the classification region are subjected to stirring in which the energy expended is lower than that expended in the stirring of the formation and growth region.

4. The process according to claim 2, wherein a crystallization adjuvant selected from the group consisting of condensed phosphates and water-soluble homo- or copolymers of acrylic acid is incorporated in the concentrated solution of an alkali metal salt.

5. The process according to claim 1, wherein the suspension density in the reaction and growth region is maintained at a value of at least 25% of solids.

6. A process according to claim 1, wherein the alkali metal persalt is an alkali metal carbonate peroxohydrate.

7. A method according to claim 6, wherein the alkali metal is sodium.

8. The process according to claim 6, wherein said classifier is equipped with a stirrer.

9. The process according to claim 1, wherein said alkali metal persalt is an alkali metal perborate.

10. The process according to claim 9, wherein said solution containing alkali metal perborate contains at least one salting-out agent.

11. The process according to claim 1, wherein the aqueous hydrogen peroxide solution contains at least 15 weight % hydrogen peroxide.

12. The process according to claim 1 wherein liquid overflow spilling over from an upper part of the classifier is injected into a circuit for dissolution of alkali metal salt to form said aqueous solution of at least one alkali metal salt.

* * * * *